United States Patent

[11] 3,609,541

[72] Inventor Winston W. Scott, Jr.
Boulder, Colo.
[21] Appl. No. 4,372
[22] Filed Jan. 20, 1970
[45] Patented Sept. 28, 1971
[73] Assignee The United States of America as
represented by the Secretary of Commerce

[54] RADIO FREQUENCY COAXIAL AMMETER WITH THERMAL COMPENSATION
9 Claims, 11 Drawing Figs.

[52] U.S. Cl. .................................................. 324/95,
250/83.3 H, 250/228, 324/106
[51] Int. Cl. ..................................................... G01r 21/04,
G01r 5/26
[50] Field of Search ......................................... 324/95,
106, 96; 250/217 SI, 228, 83.3 H; 73/355

[56] References Cited
UNITED STATES PATENTS
3,266,313 8/1966 Litterst ........................ 250/83.3 IR
3,447,083 5/1969 Luskow ....................... 324/95 X Primary Examiner—Rudolph V. Rolinec
Assistant Examiner—Ernest F. Karlsen
Attorneys—David Robbins and Alvin J. Englert ABSTRACT: A cylindrical reflector, having an inner elliptical reflecting surface, is positioned in a coaxial line. A thin-film heater is connected to the center conductor of the line. The heater is located along one focal axis of the reflecting surface and the hot junctions of a thermopile are located along the other focal axis. Input current causes the heater to radiate infrared energy which is reflected and focused onto both sides of the hot junctions. The resulting electrical output of the thermopile is proportional to radiated power and consequently input current squared, and because of thermal compensation the output is substantially independent of ambient and self-heating temperature changes.

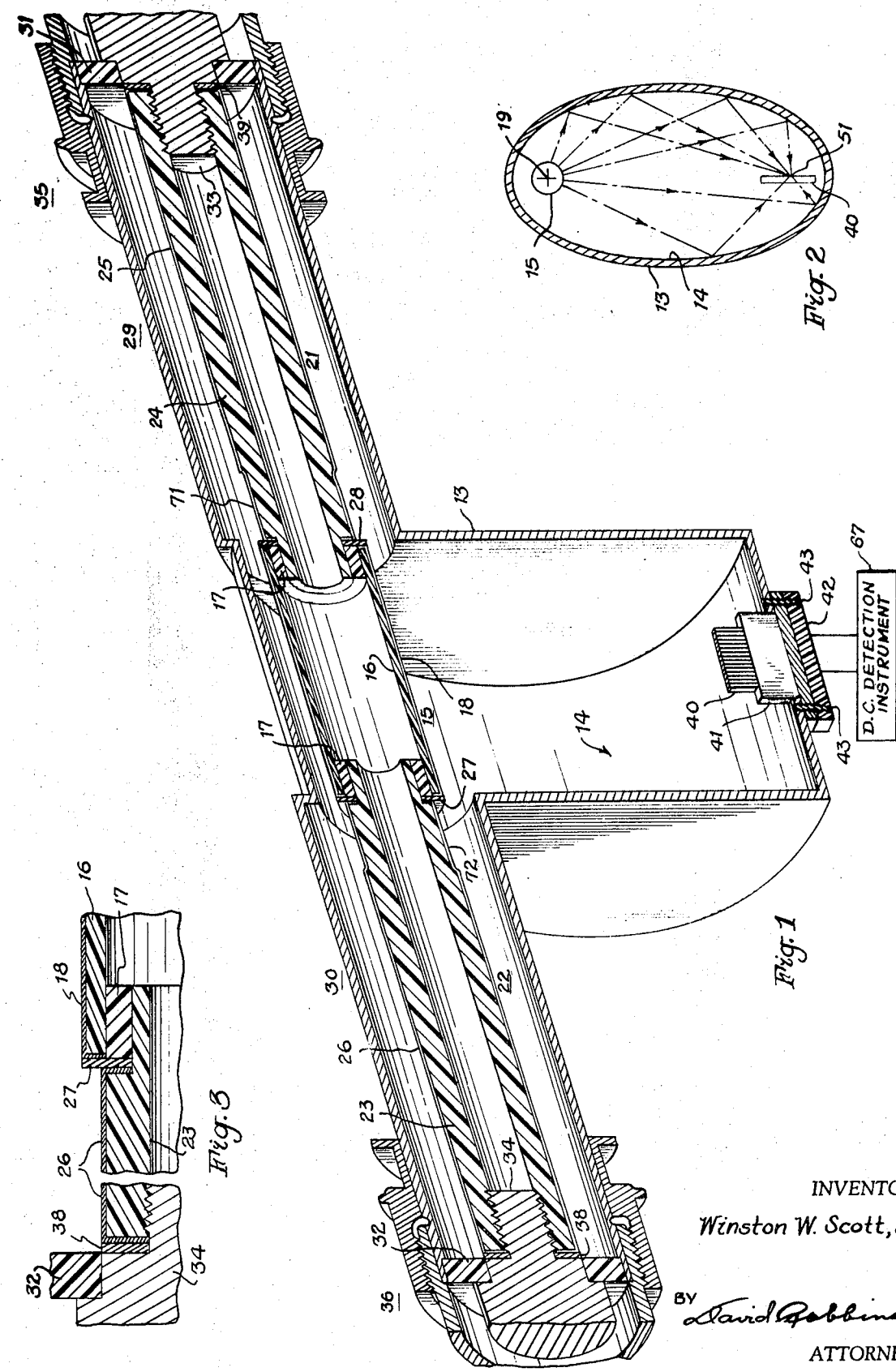

INVENTOR
Winston W. Scott, Jr.
BY
ATTORNEY

RADIO FREQUENCY COAXIAL AMMETER WITH THERMAL COMPENSATION

BACKGROUND OF THE INVENTION

When the NBS Standard Electrodynamic Ammeter was developed by the National Bureau of Standards, as an absolute standard for high frequency current, it became apparent that a reference standard was needed to transfer accurate current measurements from the NBS standard to users in industry and science. It was impractical to use other similar dynamometers as a reference standard because of their large size and cost.

The principles of the present invention may be used to fabricate an inexpensive reference standard which may be sent to NBS for calibration. The standard incorporates an ammeter that has an unusually broad frequency and current range, and will accurately measure RF current in nearly any transmission line configuration, regardless of RF connectors, transmission line impedance, or SWR. However, if a 50 ohm transmission line is used and the SWR is sufficiently low, insertion of the standard in to the line will not increase the SWR and the measured RF current is not a function of electrical length along the transmission line.

Thermal converters in the prior art, when operated at radio frequencies, show a strong interaction with their surroundings due to the lack of proper shielding or to RF leakage in the output circuitry. In contrast, the ammeter in the reference standard incorporates a well shielded thermal converter, and because of the internal physical and electrical separation (but not thermal) of the heater and thermopile circuits, RF leakage current and the associated control and analysis problems are, for all practical purposes, nonexistent.

Another old problem with conventional thermal converters, that of unusually high (for a standard) ambient temperature dependence of the thermal converter output, is resolved in this reference standard with an arrangement that compensates for ambient and self-heating temperature changes.

SUMMARY OF THE INVENTION

In accordance with the inventive concept, an ammeter is provided that employs a cylindrical reflector fabricated of electrical and thermal conductive material. The reflector has an inner elliptical reflective surface and is positioned between a pair of coaxial lines whose inner conductors have a substrate made of an electrical insulator and thermal conductive material. The inner conductors support a heater approximately along the first focal axis of the reflecting surface. The heater includes a substrate of electrical and thermal insulating material. The substrates of the heater and inner conductors have metallized outer surfaces which are in electrical conductive relationship. A thermopile, having a plurality of thermal elements, is positioned so that the hot junctions are located approximately along the second focal axis of the reflective surface and the cold junctions are in thermal conductive relationship with the reflector. Finally, the heater is in a desired thermal relationship with the reflector. In one arrangement the heater is placed in thermal conductive relationship with the reflector, while in another the heater transmits heat to the reflector through convection and radiation.

When the current to be measured is passed through the heater, infrared energy is radiated and, with the assistance of the reflecting surface, is focused on the hot junctions of the the thermopile. The thermal elements of the thermopile are connected in electrical series and are positioned so that the radiated energy falls on both sides of the hot junctions. Since the cold junctions and heater are in thermal conductive relationship with the reflector, thermal compensation is obtained. After current has passed through the heater for a relatively short period of time the ammeter reaches temperature equilibrium and the output of the thermopile is substantially independent of ambient and self-heating temperature changes.

BRIEF DESCRIPTION OF THE DRAWINGS

FIG. 1 represents a cross section of an embodiment of the present invention;

FIG. 2 represents the location of the heater and thermopile in the reflector;

FIG. 3 is a detail of components in FIG. 1;

DESCRIPTION OF A PREFERRED EMBODIMENT

Figure 4:
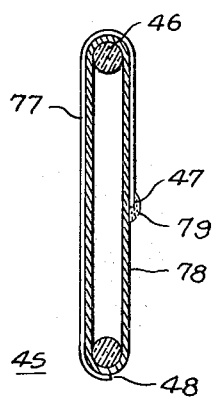
FIG. 4 illustrates and end view of the thermopile in FIG. 1.

With reference to FIG. 1, cylindrical reflector 13 encloses an elliptical reflecting surface 14 (FIG. 2) and is fabricated of electrical and thermal conductive material. Heater 15 comprises a thin-walled cylindrical substrate 16, fabricated of electrical and thermal insulator material. The bearings 17 are fabricated of the same material and are fused to the inner surface of the substrate. The outer and end surfaces of the substrate are metallized as illustrated at 18. (See FIG. 3.)

Heater 15 is positioned approximately along a focal axis 19 (FIG. 2) of reflecting surface 14 and between support arms 21 and 22. The arms include thick-walled cylindrical substrates 23 and 24 made of a material that is an electrical insulator and a good thermal conductor. The outer and end surfaces of arms 21 and 22 are metallized as shown at 25 and 26, respectively. (See 26 in FIG. 3.)

A thin washer 27, made of electrical and thermal conductive material, preferably gold 1 mil thick, is positioned between one end of heater 15 and an end of substrate 23 (FIG. 3) while a similar washer 28 is located between the other end of the heater and an end of substrate 24. The washers assist in providing uniform current density and provide some cushion for the substrate 16 of heater 15.

The support arms 21 and 22 form the center conductors of coaxial lines 29 and 30, respectively, and are attached to connectors 33 and 34 and thereby supported in the lines by beads 31 and 32. The arms are manufactured of a thermal conductive and electrical insulator material which has approximately the same low coefficient of expansion as the substrate of heater 15. The beads may be formed of a material that is a good electrical and thermal insulator, such as Telflon, or a material that is a good electrical insulator and thermal conductor, such as boron nitride.

When beads 31 and 32 are manufactured from an electrical and thermal insulating material, support arms 21 and 22 are *not* in thermal contact with reflector 13. However since the arms are made of a thermal conductive material and have a high heat capacity, heater 15 and the ammeter as a whole will come to temperature equilibrium in about 6 minutes, using the materials and dimensions described below. There will be a slight and relatively constant drift in the output of thermopile 40. Again, at high current input, the coaxial components connected to the ammeter are heated through arms 21 and 22 which causes them to expand and to change their characteristic impedance. This introduces a small error in the current measurement.

When it is desired to minimize the errors noted and to reduce the undesirable effects, as required by the precision of the ammeter under construction, the beads 31 and 32 are made of a thermal conductive and electrical insulating material. Heater 15 will then be in thermal conductive relation through arms 21 and 22 with reflector 13, and the ammeter will reach temperature equilibrium in approximately 2 minutes, when the dimensions and materials noted below are used. The drift in the output of thermopile 40 will be substantially eliminated. Further, the ammeter may be used to high values of current without introducing the errors in measurement that arise from heat applied to the coaxial components connected to the ammeter.

The center conductors 33 and 34 of conventional precision coaxial connectors 35 and 36 are attached to support arms 21 and 22, respectively, and are supported in the connectors by beads 31 and 32. A thin washer 38, fabricated of electrical and thermal conductive material, is located between support arm 22 and a shoulder of center conductor 34 (FIG. 3) while a similar washer 39 is located between arm 21 and a shoulder of conductor 33. The washers are preferably made of brass and are flash plated with gold. These washers serve as easily adjustable spacers, to allow connectors 35 and 36 to clamp the heater circuit, which includes heater 15 and support arms 21 and 22, under slight compressive stress for both heater placement and low electrical contact resistance.

Figure 6:
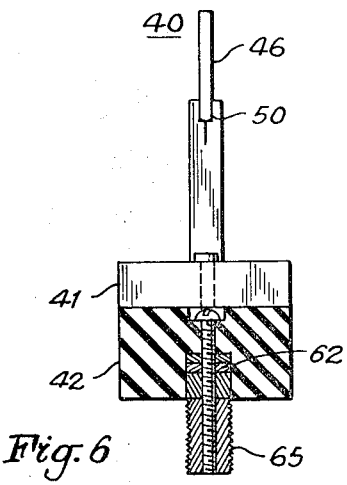
FIG. 6 presents and end view of the thermopile, T-block, and insulator plate used in FIG. 1.
Figure 7:
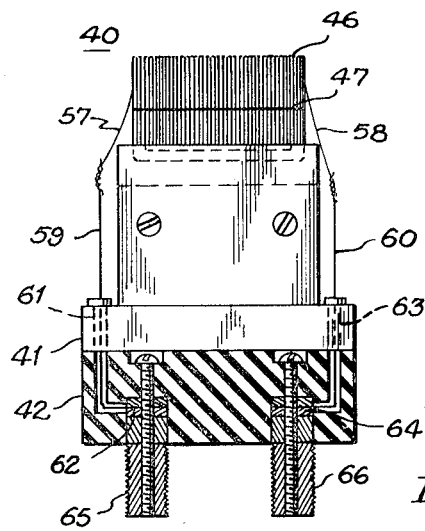
FIG. 7 presents a side view of the thermopile, T-block, and insulator plate used in FIG. 1.
Figure 8:
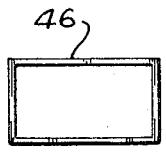
FIG. 8 shows the frame of the thermopile used in FIG. 1.
Figure 9:
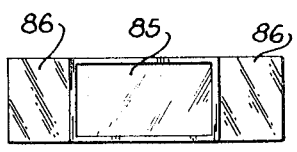
FIG. 9 to 11 show various stages in the construction of the thermopile in FIG. 1.

As represented in FIG. 1 and shown in detail in FIGS. 6 and 7, thermopile 40 is mounted on T-block 41 which in turn is connected to electrical insulator plate 42 by conventional means (not shown). The T-block, which is made of thermal conductive material, preferably silver, is connected to cylinder 13 by means of metal screws 43 (FIG. 1).

Thermopile 40 comprises a plurality of thermal elements 45 connected in electrical series and mounted on frame 46 (FIG. 5), which in this embodiment is constructed of quartz. Each thermal element 45 has a hot junction 47 (FIG. 4) and a cold junction 48. (The construction of the thermopile is described in detail below). Frame 46 is mounted in T-block 41 (FIG. 6) in such a way that the cold junctions 48 are in thermal conductive relationship with the T-block, which is prevented from shorting out the cold junctions and turns of thermopile 40 by a thin layer of insulating material 50, such as Teflon film 1 mil thick.

As illustrated in FIG. 2, thermopile 40 is positioned in reflector 13 in such a way that the hot junctions 46 of the thermopile are located approximately along a focal axis 51 of the reflecting surface 14. The thermal elements 45 of the thermopile are positioned in thermal parallel, and substantially all the radiation emitted from heater 15 is focused by the reflecting surface onto the hot junctions. Since the hot junctions 47 are located in space away from any massive material, and frame 46 is fabricated of an excellent thermal insulator, the junctions are free to quickly indicate the temperature existing at focal axis 51.

Figure 10:
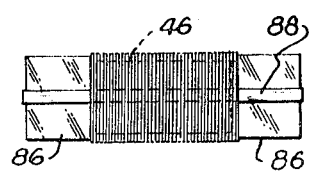
Figure 11:
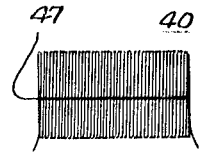

The output leads 57 and 58 (FIG. 7) of thermopile 40 are connected to leads 59 and 60 respectively. Lead 59 passes through insulator tube 61 to washers 62, while lead 60 passes through insulator tube 63 to washers 64. In this way, the thermopile output leads 57 and 58 are connected to binding posts 65 and 66, which form the output of the thermopile. A DC detection instrument 67, such as a potentiometer (FIG. 10, is connected across the output of thermopile 40. The potentiometer may be any instrument known in the art for measuring a voltage by balancing it against a known voltage.

The heater, reflector, support arms and thermopile will be described in detail below.

Reflector

Reflector 13 is preferably made of silver, selected because of its high reflective efficiency in the infrared region, ease of electromechanical deposition, and excellent thermal conductivity.

To form the reflector 13 a copper free aluminum mandrel is first milled to the desired elliptical cylindrical shape. Next, a silver plate about 0.2-inch thick is electrodeposited on the unpolished mandrel. Then the mandrel is dissolved by immersion in a caustic solution, leaving a "hollowed" silver reflector 13. The inside reflecting surface 14 of the reflector needs only minor polishing for use in the present embodiment. In addition to providing physical ruggedness, the silver construction of reflector 13 permits thermal compensation, as set forth below.

For particular elliptical reflecting surface 14 used in this embodiment, the eccentricity is 0.6945, the major axis is 1.5000 inches, the minor axis in 1.0792, inches, and the focus f is 0.2291 inch.

Heater

Heater 15 includes substrate 16 on which a thin film of resistive material is deposited, which comprises the metallized surface represented at 18. For a reflecting surface 14 having the dimensions previously described, substrate 16 has an outer diameter of 0.2840 inch, is 0.774 inch long, and has a wall thickness of 20 mils. The substrate is constructed of quartz, which is preferred because it is dimensionally stable ($5.6 \times 10^{17}$in./in./$BL$ C.) between the possible temperature limits of operation of the heater (23° C. to 600° C.), has a very low thermal conductivity (0.0023 cg.), and a very high softening point (1,580° C.).

In the present embodiment, the thin film of resistive material, represented at 18, comprises a deposit of metallic gold. About three coatings of Englehard Industries Liquid Bright Gold is used to reduce the resistance of substrate 16 to 0.3 ohm. The overall coating thickness is about 0.015 mil which results in a negligible skin effect error at 1 Hz. The gold deposit may glow cherry red (a temperature greater than 600° C.) without deterioration and resists pealing and spalling at all temperatures of heater 15. The lack of oxidation at the gold surface is an advantage.

The gold surface is coated with an efficient energy radiating material, such as camphor black, which improves the radiation efficiency and provides greater heating of thermopile 40 and therefore larger thermopile output voltage for a given input current.

Support Arms

The heater support arms 21 and 22, as previously indicated, are fabricated of an electrical insulating and thermal conductive material, which has a low coefficient of expansion approximately the same as that of the substrate of heater 15.

For substantially reflectionless transitions from cylindrical coaxial line 29, to an elliptical line that includes reflector 13, and return to another cylindrical line 30 step changes in the diameter of support arms 21 and 22 are provided and are accurately located relative to the cylindrical elliptical outer conductor transitions. More specially, in the present embodiment, support arms 21 and 22 are provided with compensation notches 71 and 72, respectively. The outer diameters of arms are 0.24425 inch, while the outer diameters of the notches are 0.240 inch. The step in each notch is located 0.20 inch from a respective end of heater 15.

Arms 21 and 22 are fabricated of boron nitride, which is easily machinable has a linear coefficient of expansion of less than $10^{17}$/in./in./° C. between 75 and 1,000° C., and has an excellent thermal conductivity about that of beryllium oxide). The process for metallizing the outer surfaces of the arms as illustrated at 25 and 26 is briefly as follows:

1. The boron nitride support arms are built approximately 3 mils undersize on a diameter.
2. The arms are cleaned first in water in an ultrasonic bath and then boiled in a diluted soap solution and finally rinsed in several containers of boiling distilled water.
3. The arms are vacuum dried and then vacuum deposited with a sufficient thickness of gold to provide electrical continuity along the surface.
4. The arms are then electroplated with enough copper to bring them up to size (0.24425 inch diameter).
5. Finally, the arms are again vacuum dried and a thin protective vacuum deposit of gold is applied.

Other techniques tried in plating the boron nitride were unsatisfactory unless the arms were ultrasonically cleaned in water and vacuum dried. The ultrasonic cleaning removes a thin layer of boron nitride power that would prevent adherent plating. The vacuum drying removes the moisture absorbed by the boron nitride which prevents spalling of the surface on application of heat.

The copper electroplate on support arms 21 and 22 is of sufficient thickness to reduce the resistance of the arms to less than a few thousandths of an ohm. Thus the arms do not produce significant $i^2R$ heat.

Heater 15, and support arms 21 and 22, with the dimensions indicated above, when assembled in the present embodiment gives a reflection coefficient of less than ±0.005 (corresponding to a SWR of 1.01 to 1.00 ) when used as a section of 50-ohm characteristic impedance transmission line and viewed with a Time Domain Reflectometer which has response from DC to about 2.3 Hz.

Thermopile

Figure 5:
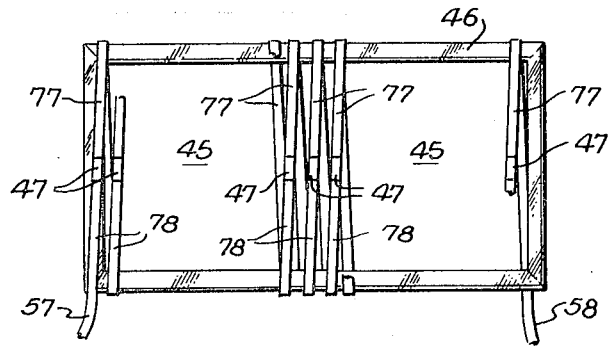
FIG. 5 illustrates a side view of the thermopile employed in FIG. 1.

The thermopile 40 comprises a plurality of thermal elements 45 (FIG. 5) positioned on frame 46 and connected in electrical series and thermal parallel. A cross section of one of the elements 45 is shown in FIG. 4. THe element comprises a constantan copper-clad ribbon 77, a hot junction 47, a constantan ribbon 78, and cold junction 48. For efficient absorption of infrared energy, the hot junction 47 is coated with an energy absorbing material 79, such as Parson's optical black (imported from England) or carbon black, as described in detail below.

With reference to FIGS. 8 to 11, the construction of the thermopile 40 used in this embodiment is detailed as follows: First a fiber 14 mils in diameter is drawn from fused quartz and formed around a stainless steel rectangular bar in order to obtain a quartz rectangular frame 46. (See FIG. 8.) The ends are fused at one corner and the frame is made flat by annealing. The quartz frame is excellently suited as a low-mass well-insulated (thermally and electrically) support for the delicate thermal element 45. The overall dimensions are one-fourth inch by one-half inch.

A blank 85 (cut from a 10 mil sheet) is cemented, using polystyrene cement, within the frame 46. (See FIG. 9.) Small ¼-inch×¼-inch polystyrene tabs 86 are also cemented to the short sides of the frame so that the work may be handled without damage. A copper foil strip 88, one-sixteenth inch wide by one-half mil thick and about 1½-inch long, is cemented on frame 46 with one edge exactly on the centerline. The frame is now ready for winding.

After constantan wire, 0.8 mil in diameter and 36-inches long, is rolled into a ribbon about 1½ mil wide and several tenths mil thick, it is washed of any oil or grease and is placed in a coil winder (not shown). Frame 46 is also placed in the coil winder and a minute amount of very thin epoxy is applied to the long sides of the frame. The purpose of the epoxy is to permanently fasten the ribbon to the frame. Both sides of frame 46 are gear rotated in the winder to avoid distorting or breaking the frame, which is made of quartz. The coil winder spaces the ribbon uniformly (140 turns/in.) along the long dimension of the frame and the epoxy permanently holds the ribbon in position.

After winding, frame 46 is removed from the coil winder and polystyrene cement is applied to the quarter of the surface of the blank 85 below the copper foil strip 88. Capillary action draws each drop of cement up to but not past the edge of the copper strip. In this manner, a mask with straight sides is easily obtained. The purpose of the copper foil 88 is to allow electrical contact to each turn of constantan (for uniform plating in the plating bath) and to allow easy application of the masking cement. The purpose of the polystyrene cement is to mask a quarter of the constantan ribbon from copper plating solutions.

The frame 46 is then placed in a plating solution which comprises copper sulfate in sulfuric acid, and the thermal elements 45 are plated for 60 sec. at 80 ma. DC current (0.5 volt potential) to obtain a 0.04 mil copper thickness. Theory and experiment indicated this is the optimum plating thickness. If too much copper is plated, the hot junctions 47 will be cooled by thermal conduction to the cold junctions 48. If not enough copper is plated, the electrical resistance of thermopile 40 will be too large for good sensitivity. The optimum plating is determined from the relationship that copper (area) = 0.18 constantan (area). The DC resistance of the thermopile is about 332 ohms, of which about 320 ohms is due to the unplated constantan ribbons 78.

The frame 46 is next placed in a bath of methyline chloride, which dissolves the polystyrene blank 85 and tabs 86 within about a minute. The copper foil strip 88 is then carefully removed from the center of frame 46 and for efficient absorption of the infrared energy the hot junctions 47 are blackened. Parson's optical black (imported from England) may be used for this purpose. Parson's optical black has high absorption (0.985) and is essentially nonselective with regard to wavelength of the incident energy (at least down to about $40\mu$). As an alternative, camphor is burned, producing a dense black smoke. Thermopile 40 is placed in the smoke with one side toward the flame, Soot (carbon black) collects on the ribbons 77 and 78 and the hot junctions 47 on that side of the thermopile. The thermopile is then turned, placed in the smoke again, and the ribbons and functions on the other side of the thermopile are blackened. In this way, both sides of hot junctions 47 are coated with carbon black.

Thermal Compensation

The embodiments described above incorporate thermal compensation which can be understood by considering two conditions: when heater 15 is operating and when it is not. Both conditions will now be considered.

The output voltage of thermopile 40 is dependent upon the difference in temperature between hot junctions 47 and cold junctions 48. The cold junctions are in excellent thermal contact through T-block 41 with silver reflector 13, and all the silver is at essentially the same temperature. When heater 15 is not in operation, according to fundamental principles of thermodynamics, all the components enclosed by reflector 13 are at the same temperature and no output voltage is generated by thermopile 40. This is true even if the ambient temperature outside the reflector 13 is changing with time because of the low thermal mass of the thermopile 40 within the relatively massive thermal reflector and the quickness which the thermopile responds to temperature changes (within a second). Experimental observations confirm the lack of output voltage with ambient temperature changes.

Thermal compensation also occurs when heater 15 is operating. Assume, for example, that beads 31 and 32 are fabricated of thermal insulator material and that current is passed through the heater. In approximately 6 minutes the heater obtains equilibrium temperature T to which the hot junctions 47 quickly respond, with the aid of infrared energy reflected from surface 14. (The support arms 21 and 22 are fabricated of thermal conductive material which allows the heater to quickly reach temperature T.) Assume now that reflector 13 increases in temperature $\delta T$ due to self-heating or other causes. To a first order approximation, heater 15 will increase in temperature $T+\delta T$ due to decreased thermal losses by air convection, conduction, and radiation. The cold junctions 48 are in good thermal contact with the reflector and likewise increase in temperature $\delta T$. Thus, heater 15 is at temperature $T+\delta T$ but the thermopile 40 sees approximately $T+\delta T-T$ or the temperature difference T between the cold and hot junctions and, respectively. Therefore, no apparent change in heater temperature occurs, and the output voltage of thermopile is constant.

Assume now that beads 31 and 32 are made of thermal conductive material and that current is passed through heater 15. In about 2 minutes, the heater reaches equilibrium temperature T to which the hot junction 47 respond, with the air of reflecting surface 14. If now the reflector increases in temperature $\delta T$, thermal compensation will be provided in essentially the same manner as just described, except that reflector 13 will be heated by radiation, convection, and thermal conduction through beads 31 and 32. Experiment shows that the thermal conduction through the beads allows not only improved heater time response to gross current changes but also improved thermal compensation.

After current is removed from heater 15 and operation is terminated, thermal compensation occurs again. For example, 5.0 amperes may be applied to the heater for 15 minutes to allow reflector 13 to reach dynamic temperature equilibrium with the laboratory (the ammeter is warm to the touch). If the current is then removed from the heater, it will take less than 3 minutes for the output voltage of thermopile 40 to drop to zero. There is no overshoot in the output voltage. Overshoot is not expected since heater 15 and hot junctions 47 cool to the temperature of reflector 13 which in this case is above room temperature. Thus thermal compensation occurs on heating as well as cooling.

Performance Characteristics

An ammeter constructed with the materials and dimensions set forth above has an unusually broad frequency range (DC to 1 Hz.) and current range (0.5 to 5.0 amperes with heater destruction at 9 amperes). The output of thermopile 40 ranges from about 1 to 100 mv. corresponding to heater 15 temperatures of 33° C. to about 600° C. The power dissipation in the heater is 0.075 to 7.5 watts. Experiment shows that for the construction shown, the output voltage is proportional to the input current raised to the 2.07 power.

The temperature coefficient of the gold used to metallize the outer surface and ends of heater 15 (FIG. 3) modifies the heater resistance with increasing temperature. This is the only source of drift in the ammeter output (maximum of 0.1 percent per minute at rated current and nil for current levels of half-rated or less). The drift may be essentially eliminated by metallizing the heater with a material of low thermal coefficient of expansion.

The position sensitivity of the hot junctions 47 of thermopile 40 relative to focal axis 51 is not critical. THe hot junctions depth of insertion into reflector 13 could be changed ±10 mils about the point of maximum thermopile output and the output would decrease by about 2 percent.

Although the ammeter described has a current range of 0.5 to 5.0 amperes, the principles of this invention can be used to construct ammeters of other consecutive ranges by constructing heaters 15 of different resistance values but with the same power dissipation. For example if the resistance of heater is 0.003 ohms and the heater has the same power dissipation (0.075 to 7.5 watts), the ammeter range is 5 to 50 amperes. Similarly, if the heater resistance is 30 ohms, the ammeter range is 50 to 500 milliamperes but because the heater resistance is now a sizeable part of the 50-ohm transmission line, the SWR is relatively large (1.6:1). The relationship of SWR to heater resistance is SWR=1+(R/50), where R is the resistance of heater 15.

I claim:

1. A radio frequency coaxial ammeter comprising:
   a cylindrical reflector made of electrical and thermal conductive material and having an inner elliptical reflective surface delineated by a first and second focal axis,
   a first and second coaxial line connected to said cylinder, and having outer conductors made of electrical and conductive material and a first and second cylindrical support arm, respectively, as their center conductors,
   said first and second support arm, each including a substrate of electrical insulating and thermal conductive material, and each having a metallized outer surface,
   a cylindrical heater including a substrate made of electrical and thermal insulator material and having a metallized outer surface,
   means for positioning said heater approximately along the first focal axis and between the first and second support arms in such a way that the outer surface of said heater is in electrical conductive relationship with the outer surfaces said first and second support arm,
   a thermopile having a plurality of thermal elements connected in electrical series and thermal parallel, each thermal element having a hot junction and cold junction,
   means for positioning said thermopile so that the hot junction are located approximately along the second focal axis and the cold junctions are placed in thermal conductive relationship with said reflector, and
   a direct current detection instrument connected across the output of said thermopile.

2. The coaxial ammeter set forth in claim 1 including:
   thermal conductive and electrical insulating connecting means for placing said first and second support arm in thermal conductive relationship with said cylindrical reflector.

3. The coaxial ammeter set forth in claim 2, wherein:
   said connecting means comprises a first and second bead, each formed of electrical insulating and thermal conductive material,
   a first coaxial connector having a center conductor connected to said first support arm, and
   a second coaxial connector having a center conductor connected to said second support arm.

4. THe coaxial ammeter set forth in claim 3 wherein: metallized,
   the end surfaces of said first and second support arm and said heater are metallized,
   a first and second washer, each made of electrical and conductive material,
   said first washer being positioned between one end of the center conductor of said first connector and one end of said first support arm,
   said second washer being positioned between the other end of said first support arm and one end of said heater,
   a third and fourth washer, each made of electrical and conductive material,
   said third washer being positioned between one end of the center conductor said second connector and one end of said second support arm, and
   said fourth washer being positioned between the other end of said second support arm and the other end of said heater.

5. The coaxial ammeter set forth in claim 1 wherein said thermopile comprises:
   a frame constructed of electrical and thermal insulator material,
   a plurality of thermal elements, each including a hot and cold junction, connected in electrical series and thermal parallel,
   said thermal elements being positioned on said frame in such a way that radiant energy reflected from said reflecting surface falls on both sides of the hot junctions.

6. The coaxial ammeter set forth in claim 1 wherein:
   said hot junctions are coated with an energy absorbing material.

7. The coaxial ammeter set forth in claim 1 wherein the outer metallized surface of said heater comprises:
   a thin film of resistive material.

8. The coaxial ammeter set forth in claim 1 wherein:
   the first and second support arms each include a step change in its diameter located relative to the cylindrical elliptical outer conduct transitions, whereby substantially reflectionless transitions are obtained from said first coaxial line to the elliptical line that includes the heater and the reflector and then to said second coaxial line.

9. The coaxial ammeter set forth in claim 1 wherein:
   the end surfaces of said first and second support arm and said heater are metallized,
   a first washer made of electrical and conductive material positioned between one end of said heater and one end of said first support arm, and
   a second washer made of electrical and conductive material positioned between the other end of said heater and one end of said second support arm.

UNITED STATES PATENT OFFICE
CERTIFICATE OF CORRECTION

Patent No. 3,609,541          Dated September 28, 1971

Inventor(s) Winston W. Scott, Jr.

It is certified that error appears in the above-identified patent and that said Letters Patent are hereby corrected as shown below:

Column 4, lines 12 and 13, the expression in parentheses should read $--5.6 \times 10^{-7} \text{in./in.}/^\circ\text{C}.--$; line 15, "cg." should read --c.g.s.--; line 52, "$10^{17}$" should read $--10^{-7}--$. Column 4, line 22; column 5, line 11; and column 7, line 16, "Hz." should read --GHz.--. Column 5, line 16; column 7, line 32; and claim 4, line 1, "THe" should read --The--. Column 5, line 33, before "blank" insert --polystyrene--. Column 6, line 57, the expression should read $--T+\delta T-\delta T--$. Column 7, line 47, the expression should read --SWR=1+R/50--. Claim 4, lines 1 and 2, delete "metallized".

Signed and sealed this 9th day of May 1972.

(SEAL)
Attest:

EDWARD M. FLETCHER, JR.
Attesting Officer

ROBERT GOTTSCHALK
Commissioner of Patents